UNITED STATES PATENT OFFICE.

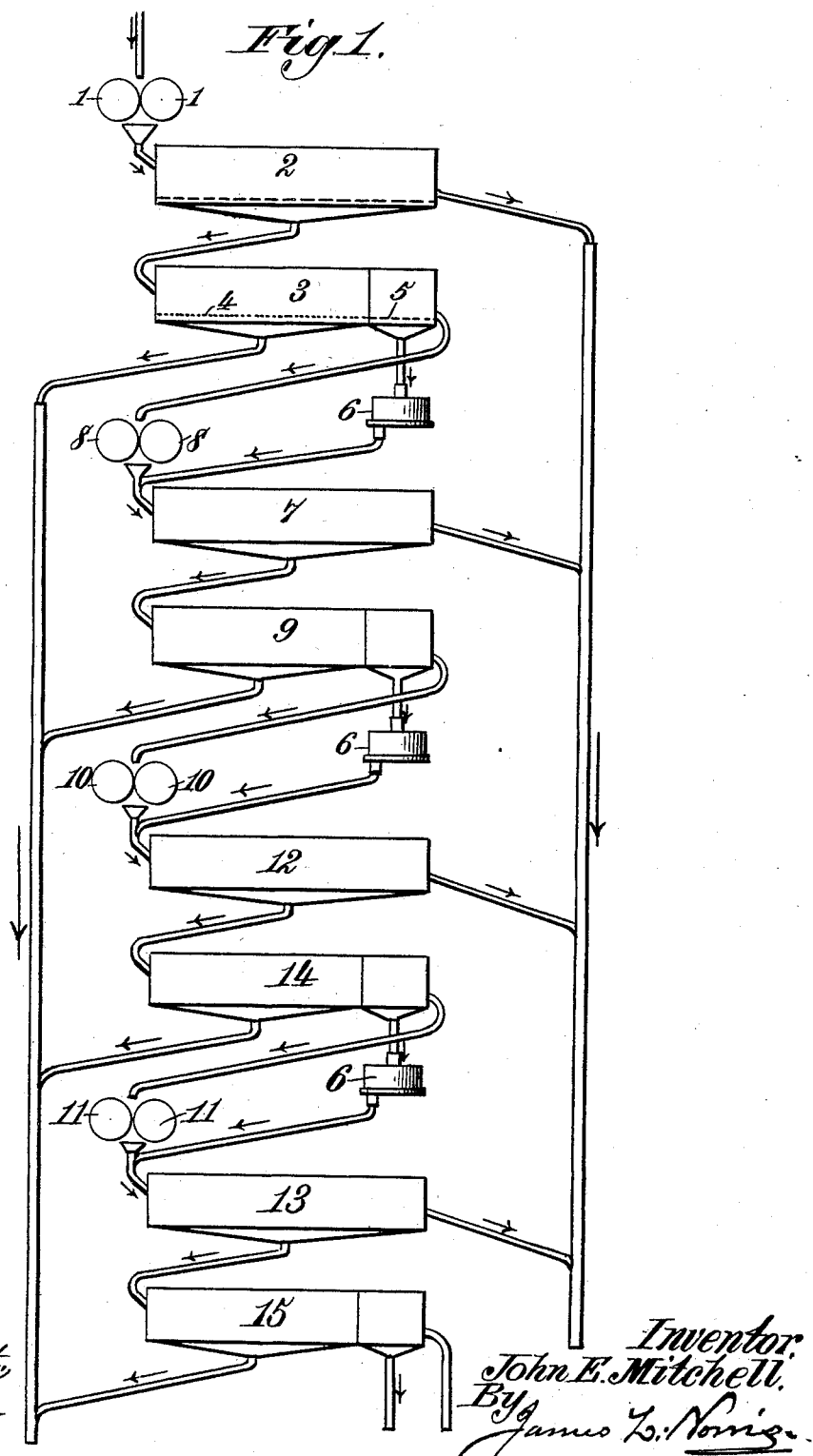

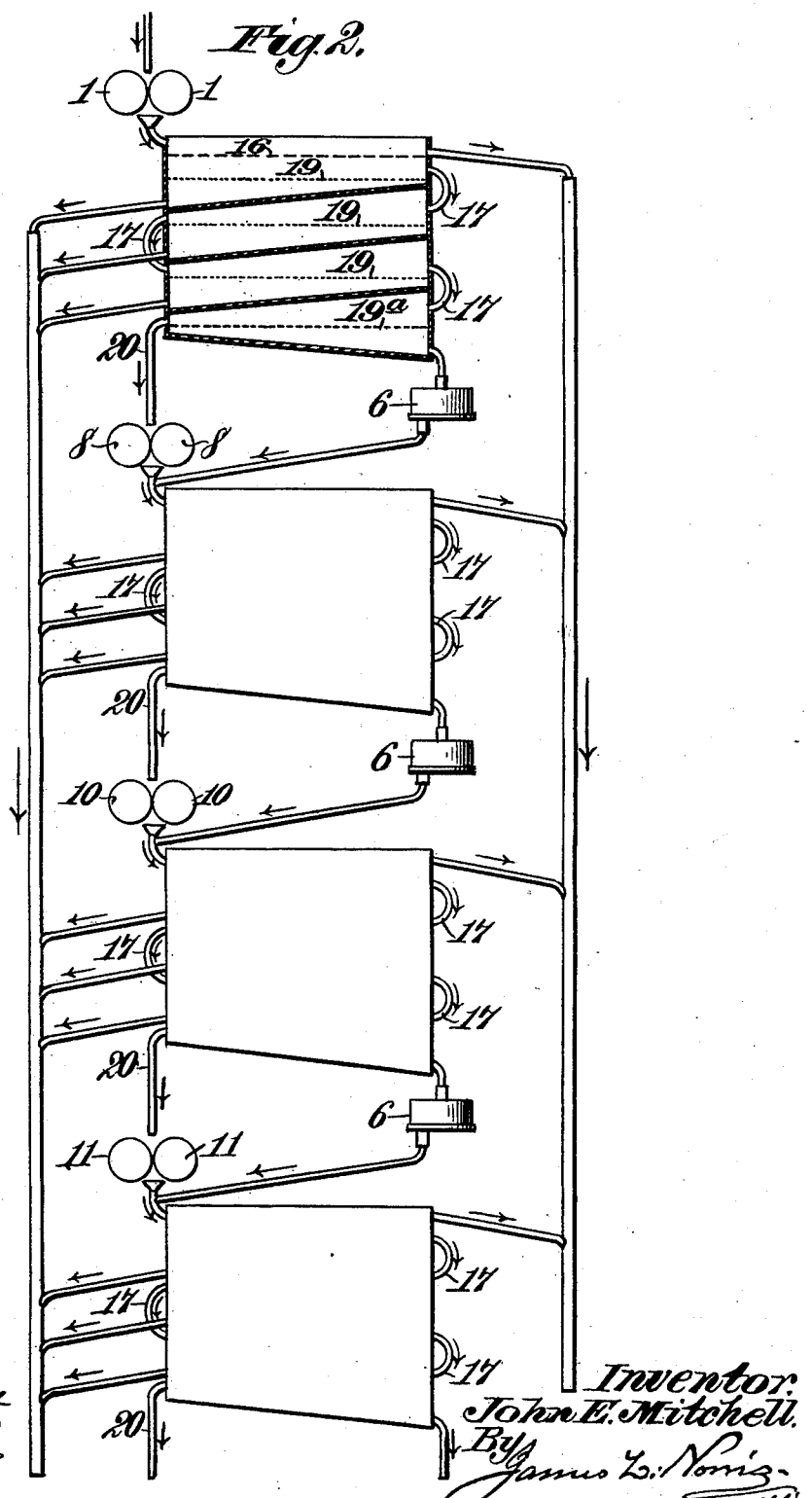

JOHN E. MITCHELL, OF ST. LOUIS, MISSOURI.

PROCESS OF MAKING FLOUR.

SPECIFICATION forming part of Letters Patent No. 716,920, dated December 30, 1902.

Application filed August 5, 1902. Serial No. 118,537. (No model.)

*To all whom it may concern:*

Be it known that I, JOHN E. MITCHELL, a citizen of the United States, residing at St. Louis, in the State of Missouri, have invented new and useful Improvements in Processes of Making Flour, of which the following is a specification.

My invention relates to improvements in the art of milling wheat-flour, the object of the same being to overcome the defects in the present system of grinding and making the separations, and thereby produce a finished flour of superior color and more even granulation and one which has greater strength and baking qualities.

The present method of producing flour by grinding and bolting consists, essentially, of two parts—first, reducing the wheat on a series of corrugated rolls and separating the bran from the middlings, &c., by means of sieves or screens, and, second, purifying the middlings or grits by air-currents and reducing the same to a fine flour by a series of reductions on smooth rolls or other crushing or grinding devices.

My invention has to do altogether with an improvement in the latter part of the above process—that is, the reduction of the middlings into flour—and has no reference whatever to the first part, which, as stated, consists of grinding the wheat and separating the bran from the remaining portions.

The old or present method of converting the middlings into finished flour consists, essentially, of crushing the purified middlings on smooth rolls, making what is called the "first reduction," and afterward conveying or spouting the crushed product to a bolting-reel or sifting-machine, where that portion of the product which has been reduced fine enough for flour is bolted through a silk cloth of proper mesh or degree of fineness. A very large portion of the product, however, which is not fine enough for finished flour passes over the silk and is conveyed or spouted to another pair of rolls, where it is again crushed, making what is called a "second reduction." The fine flour made by this second reduction is separated in the same manner as before, the residue or unfinished part of the flour passing over the silk bolting-cloth to a third reduction, and so on, with as many reductions as are necessary to reduce all the grits or sharp particles into flour. The residue passing over the sieve or bolting-cloth after the last reduction has been made is supposed to be free from flour and flour-producing particles and to consist of woody fibrous materials, small bran-cuttings, and other impurities, usually termed the "offal."

In order to produce the highest grade of flour economically, it is necessary in operating a mill, first, to prevent any of the offal or other impurities from getting into the flour; second, to prevent any good flour from passing off with the offal, and, third, to produce a finished flour with a fine even granulation without excessive grinding or other treatment that would impair its strength or injure its baking qualities. While these are three of the main objects the miller has in view, the present process of grinding and bolting referred to above fails to a very great extent to accomplish any of said objects by reason of the fact that it is impossible to make accurate or distinct separations. To show that this is so, it is only necessary to refer to the fact that the crushed product from any one of the series of reductions consists practically of three distinct classes of stock—(*a*) that which is fine enough to be bolted into a finished flour of nearly an even granulation; (*b*) the coarse gritty portion of the residue, which requires further reduction on rolls, and (*c*) an intermediate stock between the finished flour and the coarse hard stock which is too soft to require further rolling or crushing and which is at the same time too rough to be bolted into the flour. According to my improved process this intermediate product is separately ground by friction. It has been found in practice that the crushed product from any one of the reductions contains a very large per cent. of this intermediate stock, which is between flour of the proper fineness and the coarse particles which need further rolling or crushing, and according to the old process above referred to the operator is obliged either to let it pass through the system to the next succeeding reduction or bolt it through with the finished flour by using a coarser or more open bolting-silk. When this intermediate or partly-finished stock is allowed to continue on through the succeeding reductions, it is not only greatly injured by excessive grinding, but it greatly interferes with the proper working of the rolls on the hard particles or that portion of the stock which does need further rolling or crushing. The result is that the reductions are very uneven, and both a large portion of the soft intermediate stock and some of the hard stock are finally passed off into feed with the offal. The only way to avoid this loss according to the old process is to bolt the intermediate or partly-finished stock through with the flour in order to keep the stock or residue going onto the rolls in proper condition; but when this is done the flour is greatly discolored and defaced by the rough material which is bolted through with it and the market value of the same materially decreased. To overcome this weak point in the present process of milling, I designed the mill disclosed in my Patent No. 617,345, dated January 10, 1899. The object of the mill of said patent is to reduce the stock by friction or attrition, and it has been used in connection with the rolls for reducing the middlings, the object being to use it alternately or on every other reduction. The principle of said mill was that it would only reduce or flour the soft stock, while the rolls would work largely on the hard round particles. This combination of rolls and friction-grinders is still used very extensively; but as each always has to operate upon more or less of the kind or class of stock which it is not capable of reducing or adapted to reduce into flour the work of neither the rolls nor the friction-grinder is wholly satisfactory. The combination of the two devices used alternately on every other reduction has therefore only in a small way overcome the objections above mentioned to the old process, the results being nearly the same as when rolls were used alone. In either case the stock goes in a single stream or in a body through the series of reductions and the residue from each reduction goes in a body to the next succeeding reduction, and so on.

According to my improved process the middlings or unfinished residue is carried through the system in two separate or parallel streams instead of in a single stream, as in the old process, one stream containing all the coarse or hard stock being crushed by rolls and the other stream containing the intermediate or soft stock being reduced by scrolls or other friction-grinders.

In the drawings forming a part of this specification two forms of apparatus are shown by means of which my process may be carried into effect, Figure 1 showing diagrammatically an apparatus in which bolting-reels are employed for making the separations, and Fig. 2 showing diagrammatically a sifting-machine for making the separations.

According to Fig. 1 the first reduction is made, as shown, by smooth rolls 1 1 on the purified middlings, the crushed product going to a scalping-reel 2, which is clothed with a coarse bolting-silk for the purpose of scalping off or removing the coarse foreign matter. The product passing through the bolting-silk of the scalping-reel 2 falls into the flour-dressing reel 3, the larger part of which is clothed with a bolting-silk 4 of the proper degree of fineness to finish the flour uniformly which passes through it. The balance of the reel 3 is clothed with a somewhat coarser or more open silk 5, known as the "tail-cloth," which lets through an intermediate stock that is hardly of the proper fineness and face to go with the finished flour, but is at the same time entirely too soft to be handled successfully on the next succeeding rolls. The same has already been rolled sufficiently and only needs to be reduced slightly or disaggregated to convert practically all of it into flour of the proper degree of fineness. For this purpose I use a scroll or other mill 6, that grinds by friction—for example, one constructed in accordance with my Patent No. 617,345, heretofore referred to—and after reducing this stock by such a mill it is sent to the next succeeding scalping-reel 7, similar in all respects to the reel 2, heretofore referred to. The coarse stock or residue which passes over the tail-cloth 5 of the dressing-reel 3 contains the hard round particles that require further rolling, and being entirely free from any soft material it is in perfect condition for the rolls. This coarse stock is conveyed to and crushed upon the rolls 8 8, and the intermediate or soft stock is reduced or disintegrated on the scroll-mill 6. The two streams of material thus acted upon are then run together to the next succeeding scalping-reel 7 and thence to the next succeeding flour-dressing reel 9, where the separations are made in the same manner as before, and so on through the successive reductions until all the flour-producing particles are converted into finished flour of practically the same degree of fineness. The rolls 10 10 and 11 11 of the third and fourth reductions are substantially the same as the rolls 1 and 8, the scalping-reels 12 and 13 are of substantially the same construction as the scalping-reels 2 and 7, and the flour-dressing reels 14 and 15 are of substantially the same construction as the corresponding reels 3 and 9. The scalpings removed from the reels 2, 7, 12, and 13 are conveyed along the lines indicated to a suitable dump or receptacle, and the finished flour, which passes through the dressing-reels 3, 9, 14, and 15, passes along the lines indicated to a common receptacle. The flour is taken out after each succeeding reduction through silk of the proper mesh to insure its uniformity and freedom from impurities, and the residue before each succeeding reduction is separated into two separate streams, the coarse hard stock going to crushing-rolls and the soft intermediate stock going to scrolls or friction-disaggregating mills. According to this process fewer reductions are necessary and but half as much roll-surface is required as according to the old system. The finished flour can easily be kept free from offal and other impurities, and the offal can be kept free from the flour. As the two streams of stock are always in perfect condition for the kind of mill used for their reduction, the reduction is done easily and without injury to the strength or baking qualities of the flour.

As above stated, Fig. 2 of the drawings shows diagrammatically the application of my improved process to a sieve system of bolting. The rolls 1, 8, 10, and 11 and the friction disaggregating devices 6 are the same as the corresponding parts shown in Fig. 1. The separations are made in substantially the same manner as according to the apparatus shown in Fig. 1, except that instead of the scalping-reels and flour-dressing reels a series of flat sieves are employed. The upper sieve 16 of each set of sieves being clothed with a coarse open silk constitutes the scalper, the coarse particles from which pass along the lines indicated to the common dump or receptacle. The stock passing through the sieve 16 is conveyed, as shown by arrows 17, over a series of sieves 19, clothed with fine silk, through which the flour passes, the last or lowermost sieve 19$^a$ being clothed with a more open silk to let through the soft intermediate stock, which goes to the scroll 6. Beneath each of the sieves 19 is an imperforate bottom, which receives the flour which passes through said sieves 19 and from which bottom the finished flour passes along the lines indicated to a common receptacle. The hard coarse stock passing over the last sieve 19$^a$ is conveyed, as indicated by the arrows 20, to the crushing-rolls of the next succeeding reduction. After the two streams are reduced on the rolls 8 and on the friction disaggregating device 6 they run together, as shown, and go to the next series of sieves, where the separations are repeated, and so on as before. The residue after the flour is taken out is always separated in two streams, the coarse hard particles going to the crushing-rolls and the intermediate or soft particles to frictional disaggregating devices.

Having described my invention, what I claim as new, and desire to secure by Letters Patent, is—

1. The process of making flour, which consists in crushing or grinding the middlings, by rolls, screening the same to remove the flour and separate the same from the coarser particles and to simultaneously divide the latter into two masses, one containing the hard coarse particles that require further crushing and the other containing the soft fine particles that do not require further crushing, subjecting the hard particles in one mass to a further crushing, by rolls, disaggregating the soft particles in the other mass by friction, screening the two masses together after they have been thus treated, to remove the flour and separate the same from the coarser particles, and to simultaneously divide the latter into two masses, and proceeding as before with said two masses through one or more successive reductions.

2. The process of making flour from purified middlings, by two or more successive reductions, which consists in crushing or grinding the middlings, screening the same to separate and remove any coarse foreign matter, screening the remaining portion to remove the flour and separate the same from the coarser particles, and to simultaneously divide the latter into two streams, one containing the coarse hard particles that require further crushing and the other containing the soft fine particles that do not require further crushing, subjecting the stream containing the hard particles to a further crushing, by rolls, disaggregating the soft fine particles in the other stream, by friction, uniting the two streams after they have been thus treated, screening the united mass to remove the flour, and separate the same from the coarser particles, and to simultaneously divide the latter into two streams, and proceeding as before with said two streams through one or more successive reductions.

In testimony whereof I have hereunto set my hand in presence of two subscribing witnesses.

JOHN E. MITCHELL.

Witnesses:
A. P. WEINGARTNER,
MARK MAITLAND.